May 19, 1942.  E. ERICKSON  2,283,601

INDICATOR MECHANISM FOR TIRES

Filed Dec. 20, 1940

Inventor
Elmer Erickson.
By Nunn, Anderson & Liddy
Attorneys

Patented May 19, 1942

2,283,601

UNITED STATES PATENT OFFICE 2,283,601

INDICATOR MECHANISM FOR TIRES

Elmer Erickson, Lake Orion, Mich.

Application December 20, 1940, Serial No. 371,024

1 Claim. (Cl. 200—58)

This invention relates to an indicating mechanism for tires.

An object of the invention is the provision of a mechanism which is controlled by the degree of inflation of the tires of the vehicle for indicating to the driver of the car the condition of the tires at all times so that he can tell whether a tire is losing air without necessitating the stopping of the car for the inspection of the tires.

Another object of the invention is the provision of a mechanism for disclosing to the driver of the vehicle the degree of inflation of the tires of the vehicle at all times so that when he is warned of a partial deflation of the tire he can take the necessary steps to supply additional air, or to replace the tire if necessary.

A further object of the invention is the provision of a mechanism for indicating to the driver of a vehicle the degree of inflation of the tires or for disclosing the degree of deflation of the tires so that he can take the necessary steps imediately to replace the tire, or if the degree of deflation is such that he will have time to reach a station he may proceed to the station and have the necessary correction made either by additional air, or by changing the tire.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claim.

Figure 1:
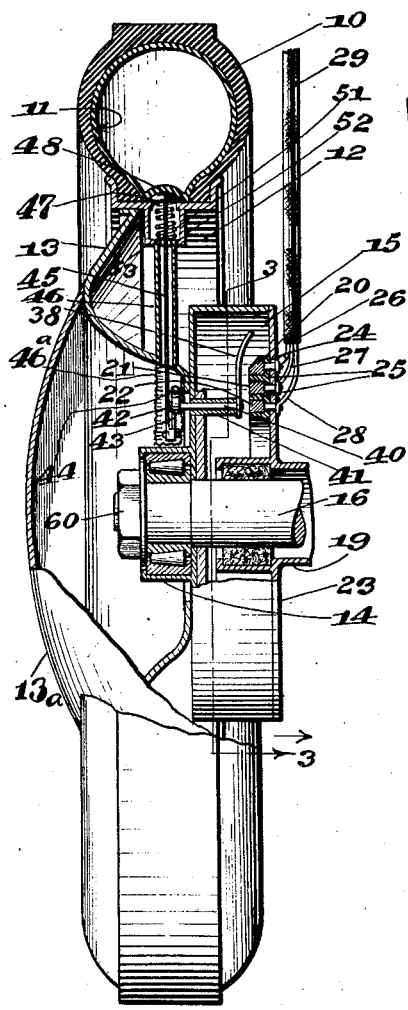
Figure 1 is a view in elevation of a tire partly in section showing my indicator applied thereto.
Figure 2:
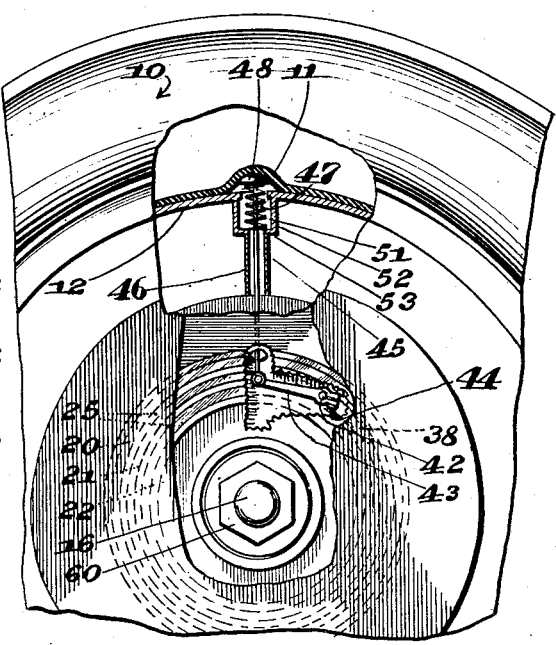
Figure 2 is a fragmentary side view of a tire partly in section showing the mechanism being moved to indicating position by the deflation of the inner tube.
Figure 3:
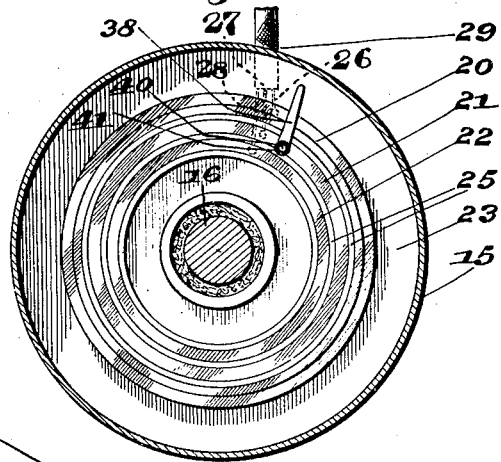
Figure 3 is a vertical section taken along the line 3—3 of Fig. 1.
Figure 4:
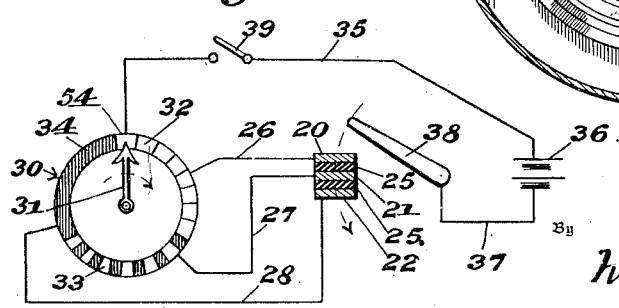

Figure 4 diagrammatically discloses a circuit of the electrical system connected with the indicator.

Referring more particularly to the drawing, 10 designates a casing provided with an inner tube 11. The casing and inner tube is mounted on a rim 12 which is supported by a disc 13 connected to a hub section 14 of the automobile wheel. A hub cap is shown at 13a.

A brake drum 15 is connected with the hub section 14 and revolves therewith on an axle 16.

Three rings 20, 21 and 22 are secured on the inner face of a stationary plate or disc 23 which is secured to the axle housing 19 and which forms a cover for the revolving drum 15. These rings are mounted upon an insulating ring 24 which is located between the rings and the inner face of the disc 23. The rings are also insulated from each other as shown at 25.

Wires 26, 27 and 28 are respectively connected to the stationary rings 20, 21 and 22. These wires are mounted in a sheath 29 which carries the wires to an indicator generally designated by the numeral 30.

The indicator mechanism is of any well known type for causing rotation of the hand 31 in accordance with varying degrees of current supplied for moving the hand over a section 32 which discloses to the operator of the car that the tire has begun to lose air. When the hand moves to the section 33 it indicates to the driver that the tire has reached the "soft" stage. When the indicator hand 31 reaches the dark section 34 of the dial it will indicate that the tire has become flat. A wire 35 connects the indicator mechanism with a source of current 36, while a wire 37 connects a switch element 38 with a source of current. A switch 39 may be employed in the circuit and may be connected with the usual ignition system so that when the engine is started the switch will be closed to the indicator 30.

The switch element 38 which is of spring material so that it will exert a slight pressure on the rings is connected to a cylindrical shaft 40 mounted in a bearing 41 which is carried by the drum 15.

A square end of the shaft 42 is received by a square opening in a split end of a crank 43. A cap screw 44 clamps the split end to the shaft 42.

A reciprocating rod 45 has its inner end connected to the other end of the crank 43 as shown at 45. This rod extends through a sheath 46 that has its outer end connected to the inner face of the rim 12 and houses an opening 47 in said rim. A dust boot 46a surrounds the outer end of the rod 45. A head 48 is connected to the outer end of the rod and is located exteriorly of the rim 12 and engages the inner periphery of the inner tube 11 and is maintained against the outer face of the rim when the proper degree of pressure is maintained within the inner tube.

A spring 51 presses against the head 48 for forcing said head against the inner tube 11. The spring is located within an enlarged portion 52 of the sheath 46 to provide a shoulder 53 upon which the inner end of the spring is seated.

The operation of my device is as follows: When the tire is in normal inflated condition the inner tube 11 will be pressing against the head and the tension of the spring 51 and thus the crank 43 will be extended inwardly towards the hub section 14 so that the free end of the spring switch 38 will be out of engagement with any of the rings 20 to 22, inclusive.

When the air pressure within the inner tube 11 decreases sufficiently the spring 51 will force the head 48 outwardly and thus move the crank arm 43 so that the end of the member 38 will move into engagement with the ring 20 whereby the indicator hand 31 will move from its inoperative position as shown at 54 to the section 32 which will indicate to the operator of the automobile that one of the tires has lost air. Continued loss of air, however, will cause the head 48 to move further outwardly and the indicator mechanism will move the hand 31 to the section of the dial shown at 33 which will tell the operator of the car that the tire has become soft. However, when the tire becomes deflated the hand 31 will move to the section 34 because the spring 51 will have moved the head 48 outwardly to its extreme limit when said head on the rod 45 will engage the inner face of the rim 12.

It will be seen by this construction that a new disc 13 equipped with a properly inflated tire 10 may be substituted for the disk carrying the deflated tire by the proper manipulation of the usual nuts that clamp the disk to the hub section. Before removing the disk 13 it will be necessary to unscrew the member 44 so that the crank 43 may be removed from the end of shaft 42. Since the rings 20 to 22, inclusive, are connected to the stationary disc 23, these parts will not be disturbed. When a disc with a properly inflated tire is placed again on the axle the split end of the crank 43 will receive the end of the shaft 42 and when the screw 44 is tightened the arm 38 will be in proper relation with respect to the rings 20 to 22, inclusive, and also in a position to be moved over the rings when the new casing becomes deflated.

No mechanism is disclosed for operating the hand 31 because any well known form may be employed for the purpose. However, the mechanism is such that when the circuit is closed through the ring 20 and the switch arm 38 the hand 31 will be moved over the section 32. When the circuit is closed through ring 21 and the switch arm 38 the hand will be moved over the section 33, while when the switch arm 38 engages the ring 22 the hand will be moved to the section 34 on the dial.

I claim:

In a demountable wheel, a housing having one end open and secured to the wheel in concentric relation thereto, a radially disposed rod mounted for reciprocation on the wheel and having a head in engagement with the inner tube in the casing of the wheel, a spring urging the head against the inner tube but normally maintained against movement by a predetermined pressure within the tube, a stationary plate secured to the axle housing of the vehicle and closing the open end of the housing, annular contacts and an annular insulated member separating the contacts mounted on the inner face of the plate, a shaft parallel to the horizontal axis of the wheel and rockably mounted in the housing with one end of said shaft projecting externally of the housing, a switch arm secured at one end to and located within the housing end of the shaft, the free end of the arm movable over the contacts and insulated member and normally out of engagement with either contact when the tire is fully inflated, a lever located externally of the housing and pivotally connected at one end to the rod, the other end of the lever being secured to the other end of the shaft so that when the rod is reciprocated said arm will be rocked and move the free end of the arm over the contacts successively.

ELMER ERICKSON.